United States Patent [19]
Sang

[11] Patent Number: 5,143,194
[45] Date of Patent: Sep. 1, 1992

[54] SAFETY SHUT DOWN SYSTEM FOR LUGGAGE CONVEYOR SYSTEM

[76] Inventor: Andy Sang, 434 W. Touhy, Lot 268, Des Plaines, Ill. 60018

[21] Appl. No.: 726,265

[22] Filed: Jul. 5, 1991

[51] Int. Cl.⁵ .............................................. B65G 43/08
[52] U.S. Cl. .................................... 198/301; 198/810; 198/464.4
[58] Field of Search ............... 198/301, 318, 304, 810, 198/832, 464.4; 244/137.1, 137.2; 414/345, 346

[56] References Cited

U.S. PATENT DOCUMENTS

| | | | |
|---|---|---|---|
| 3,051,295 | 8/1962 | Moy | 198/318 X |
| 3,066,789 | 12/1962 | Schmeck et al. | 198/810 |
| 3,184,045 | 5/1965 | Fry | 198/318 X |
| 3,524,558 | 8/1970 | Mastracci et al. | 414/345 |
| 3,952,864 | 4/1976 | Schlagel | 198/810 |
| 4,396,111 | 8/1983 | Kent | 198/810 |
| 4,733,767 | 3/1988 | Anderson et al. | 198/304 |
| 4,782,938 | 11/1988 | Cooper et al. | 198/301 |

*Primary Examiner*—D. Glenn Dayoan

[57] ABSTRACT

A safety system for a conveyor system used for transporting luggage or the like wherein a switch and relay are provided for stopping a conveyor in response to luggage becoming jammed in the conveyor system.

2 Claims, 1 Drawing Sheet

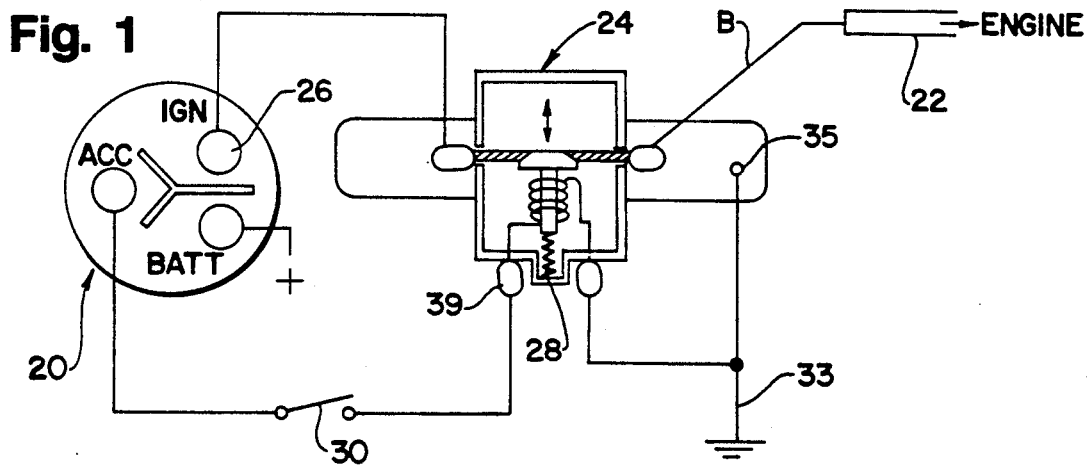
Fig. 1
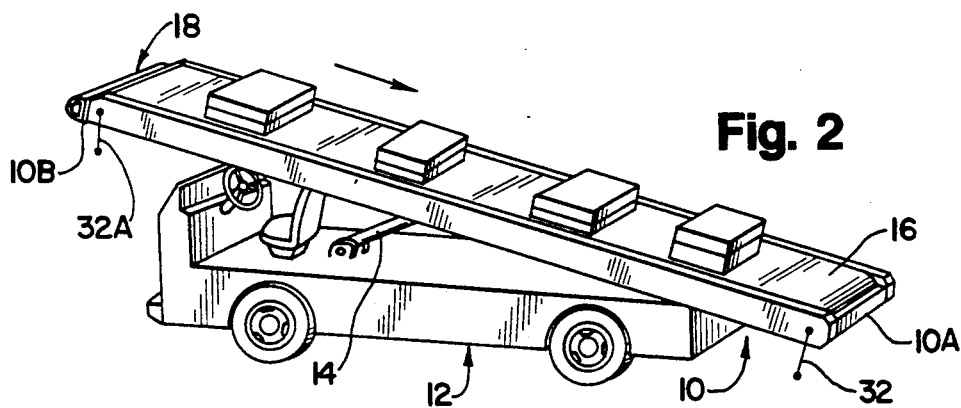
Fig. 2
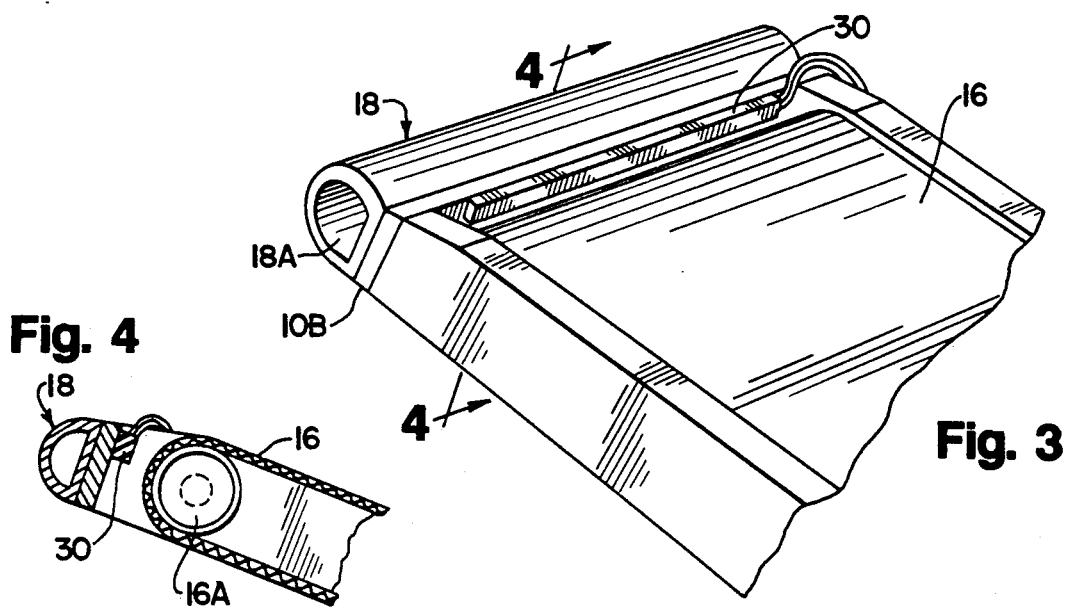
Fig. 3
Fig. 4

SAFETY SHUT DOWN SYSTEM FOR LUGGAGE CONVEYOR SYSTEM

BACKGROUND OF THE INVENTION

In the transportation of luggage to and from airplanes or other vehicles, it is desirable to have a conveyor device that can be halted when the luggage or even a human limb gets jammed or lodged in the conveyor system.

It is therefore an object of this invention to provide a new and improved luggage conveyor system that is halted when suitcases, human limbs or other jamming objects become lodged therein. A ribbon switch acts as a sensing device that is tripped by a certain force from a hand or other object, such as luggage, including bags with straps, when they press against the switch.

It is further an object of this invention to provide a simple and economic way to stop a conveyor system.

By providing a separate circuit which includes a pressure-sensitive switch means such as a ribbon switch that is tripped in response to the force from a piece of luggage or limb, a relay that is inserted into the system is tripped, thereby cutting off the motor that has an electrical ignition system, as will be described. The relay, in being preferably best closed by spring biasing, goes to its open position on deenergizing due to the magnetic force overcoming the force of the spring. Thus, I have provided a means of stopping the conveying system in response to jamming in the conveying system by means of opening the relay that feeds current to the engine.

In the use of conveyor systems for luggage, it is a fact that the space immediately adjacent to the conveyor roller of the moving conveyor and the safety bumper is usually the Achilles heel of a portable conveying device where luggage or limbs generally get lodged or jammed. By placing a ribbon switch along this opening to sense any extra weight being pressed against same, I have provided a new and improved conveying device that is halted when luggage or limbs are lodged in the space. Items that have become lodged may be dislodged by reversing the belt direction and restarting the engine.

It is also an object of this invention to convert conveyor systems by adapting and retrofitting my invention to any motorized conveyor system. As will be seen, by merely appropriately placing the ribbon switch and adding a relay and rewiring the conveyor system, I can easily adapt my invention to portable conveyor systems.

While other safety shut-down systems exist, they require operator activation. Due to jet engine noise and other ramp distractions, the operator located at the bottom of the conveyor may be unaware of the jam at the top of the conveyor. Shut-down time is especially critical when the operator at the top of the conveyor has his hand caught. It is therefore an object of the invention to provide a safety shut-down system that can operate without operator activation and thereby eliminate the problems caused by noise and other ramp distractions.

DESCRIPTION OF THE DRAWINGS

Referring to the drawings wherein like characters of reference indicate corresponding parts throughout, I have provided a preferred embodiment of my invention:

FIG. 1 is a schematic view illustrating a relay that has an opening circuit in accordance with the invention;

FIG. 2 is a pictorial view of a portable conveyor system of the type that is generally used at airports by being associated with a truck it can be transported to and associated with an airplane;

FIG. 3 is an enlarged view of the end of the conveyor system wherein the safety bumper of the conveyor and ribbon switch are shown in more detail; and FIG. 4 is a sectional view of the conveyor taken along a plane passing through lines 4—4 and looking in the direction of the arrows.

DESCRIPTION OF THE PREFERRED EMBODIMENT

Referring to the drawings, a portable conveyor system 10 is illustrated in FIG. 2. It includes a motor-powered land vehicle such as a truck 12 that has a hydraulic actuator 14 associated therewith that raises and lowers the conveyor belt 16 of the portable conveyor system 10.

The conveyor belt 16 has a pivotal end 10A pivotally associated with the truck 12 while being associated with a hydraulic actuator 14. The hydraulic actuator 14 raises and lowers the conveyor belt to change the angle of the conveyor system 10 for association with airplanes and other vehicles having different height requirements for the conveyor system 10.

As seen from FIG. 3, the conveyor system 10 has a safety bumper means 18 that is associated with the connecting end 10B of the conveyor system 10 in order that an airplane or other vehicle can be associated with the conveyor system 10 while still protecting the airplane or other vehicle from direct contact.

Vehicles of the type carrying conveyor belts 16, usually have an electrical ignition system provided therein for actuating the vehicle. As seen from FIG. 1, in accordance with my invention, an ignition button switch 26 is diagrammatically represented as being electrically connected with an engine 22 by means of a spring biased, normally closed, relay 24 so that when it is desirable to start the conveyor belt 16, the ignition button switch 26 is turned to the ignition-position and the conveyor belt 16 is actuated by the normally closed relay 24 which is kept in its closed position by the spring 28 that biases the relay upward.

When it is desired to stop the conveyor system 10, the ignition button switch 26 can either be turned to off directly or the conveyor system can be turned off in response to the ribbon switch 30 whose location is illustrated in FIGS. 3 and 4. Also, control devices such as the levers 32, 32A can independently disengage and/or reverse the hydraulic motors (not shown) and thereby stop or change the direction of the conveyor belts. The hydraulic motors customarily drive the conveyor system and are driven by the engine of the vehicles of this type.

As seen from FIGS. 3 and 4, the ribbon switch 30 is disposed in the opening between the end roller 16A of the conveyor system and the safety bumper 18 to sense any piece of luggage or other object, or for that matter a hand, and thereby actuate the ribbon switch 30, which in turn enables the relay 24 to cut off the engine 22 by being caused to move downward to its "open" position due to magnetic force overpowering the biasing force of spring means 28 of the relay 24. After reversing the belt 16 with the levers 32, 32A, the engine 22 can be started again and cranking occurs until the belt 16 jars a suitcase or part loose, whereupon the levers 32, 32A controlling the belt can be repositioned to resume the normal operation.

My invention can be easily retrofitted to an existing conveyor system which does not have the safety ribbon switch means 30 or relay 24 by mounting a relay 24 under the dashboard (not shown) in the area of the ignition switch 26 and connecting the ground wire 22 to the mounting bolt 35 as shown in FIG. 1. Thereafter, the existing wire (now shown) from the ignition has to be removed from the ignition button switch 26 and an extension "B" has to be added to it as necessary to connect the relay 24 to the engine 22 as shown in FIG. 1. Also, a new lead "C" is added to the ignition terminal 37 and the ignition button switch 26 has to be installed. Then, the ribbon switch 30 is adhered to 10B as shown in FIG. 3, with one lead wired to the accessory port (ACC) of the ignition switch (IGN) and the other lead to the relay terminal 39 as shown. Then, the conveyor belt 16 is ready to operate with the ribbon switch 30 of my invention.

As can be seen from FIG. 4, the ribbon switch 30 can be held against the connecting means 18 with the fingertips and slid down until the fingers contact the belt. This has been found to be an ideal place for the location of installation of the ribbon switch. However, it is contemplated that other locations where the ribbon switch can be operatively associated with the conveyor system 10 to sense the pressure of a jam caused by lodging and thereby automatically halt the conveyor belt 16 without an operator.

Other objects and advantages will become apparent from viewing the claims.

What is claimed is:

1. A luggage conveyor system that can be associated with a vehicle for loading or unloading and it is automatically halted when luggage or other jamming objects become lodged therein comprising: an ignition system with means for activating said conveyor system; engine driving means that is operatively associated with said conveyor system to drive said system when said ignition is activated; a manually closed relay that feeds current to said engine from said ignition system when said ignition system is activated and said conveyor system having a pressure-sensitive switch that is disposed and connected to be tripped in response to the force of a jamming object being lodged in said conveyor system, said pressure-sensitive switch causing said relay to open and to deenergize said engine driving means by cutting off the current being supplied to it and in turn halt said conveyor system in order that the jamming objects can be dislodged therefrom;
said conveyor system having manual means for reversing the conveyor direction to dislodge jamming objects therefrom after said engine has been halted;
said conveyor system having a safety bumper means in contact with the vehicle being loaded or unloaded to protect it from direct contact with the conveyor system and said pressure-sensitive switch is disposed between said safety bumper and said conveyor system;
said conveyor system having rotating conveyor end rollers with one of said rotating conveyor end rollers being adjacent to an end of said conveyor system with a space therebetween that has luggage frequently loaded therein that is included in said conveyor system, and said pressure-sensitive switch is a ribbon switch and it is disposed in said space between said conveyor system and said conveyor end rollers of said conveyor system in order to sense pieces jammed in the space between said roller and said safety bumper.

2. A luggage conveying system as defined in claim 1 wherein said relay is spring-biased and tripping of said relay to its open position occurs when current is circulating and the magnetic force of the relay overcomes the force of said spring after said ribbon switch is tripped due to jamming.

* * * * *